No. 679,898. Patented Aug. 6, 1901.
E. JOSSE.
MEANS FOR SEALING PARTS OF MACHINERY.
(Application filed Feb. 25, 1901.)
(No Model.)
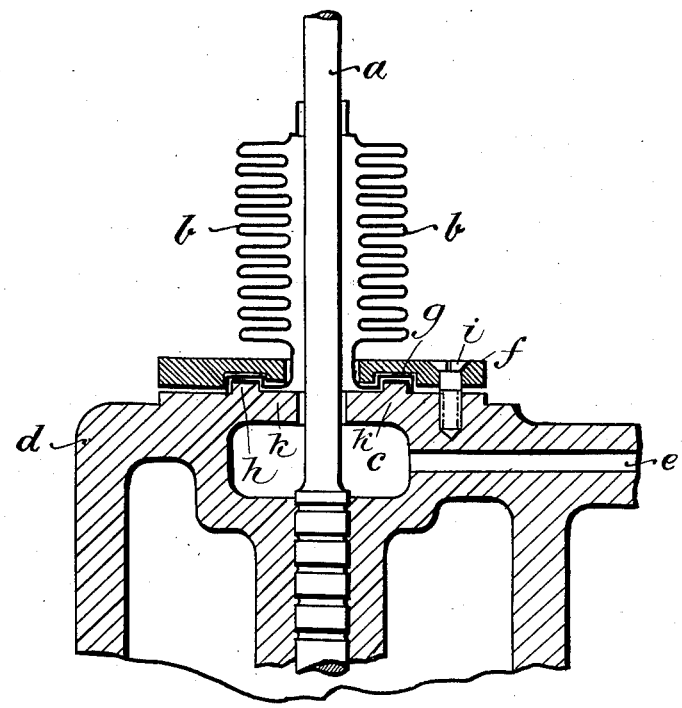

UNITED STATES PATENT OFFICE.

EMIL JOSSE, OF WILMERSDORF, GERMANY.

MEANS FOR SEALING PARTS OF MACHINERY.

SPECIFICATION forming part of Letters Patent No. 679,898, dated August 6, 1901.

Application filed February 25, 1901. Serial No. 48,745. (No model.)

*To all whom it may concern:*

Be it known that I, EMIL JOSSE, residing at 158 Uhlandstrasse, Wilmersdorf, in the Kingdom of Prussia, German Empire, have invented certain new and useful Improvements in Means for Sealing Parts of Machinery which have Reciprocating or Oscillating Motions, of which the following is a specification.

This invention relates to an improved means or contrivance for packing or sealing parts of machines having reciprocating oscillating motions or the like.

By means of this invention parts of machinery with reciprocating or oscillating motions are securely packed or sealed against external or internal pressure by connecting the movable part with an expanding or telescopic sheath or closed part and firmly connecting the expanding and contracting part with the part to be packed or sealed against external or internal pressure and combining these parts with a concealed outlet-chamber. The expanding and contracting elastic part, which resembles a bellows in its action, may be made of different kinds of material (steel, copper, india-rubber, or the like) and in various shapes or forms. This sealing can further be employed in combination with any preferred packing, and for the purpose of relieving the strain on the elastic packing the space between the ordinary packing and the sealing device is connected with either a condenser, an absorber, or the atmosphere.

In the accompanying drawing the invention is shown, by way of example, in connection with the valve-spindle of a cold-vapor engine.

The spindle $a$, having reciprocating motion, is firmly connected with the elastic or bellows part $b$, (being soldered thereto,) and the other end of this bellows portion is connected with the valve-casing $d$ by means of a plate $f$, which is provided with an annular recess $g$, which fits over an annular rib $h$ on the cylinder-head. The plate $f$ is held firmly in place by a screw or screws $i$. The elastic or bellows part may act either as a sealing device in relation to the vapor-inlet, or, as in the present case, for this purpose any known form of construction may be employed. The vapors escaping or leaking through this packing arrangement enter the concealed chamber $c$, which is contained in the casing $d$ beneath its top plate $k$. The vapors can be carried off as desired through the passage $e$ either into a condenser or into a vessel filled with a suitable fluid, in which they are absorbed, or they may be discharged into the atmosphere, where they are without harmful effect.

What I claim, and desire to secure by Letters Patent, is—

The combination of a cylinder, having a chamber $c$ below its end wall $k$, a rod $a$ passing through said chamber and said end wall $k$, an outlet $e$ from said chamber, and the bellows $b$ secured at one end to the rod, and clamped at the other end to the outer side of the plate $k$.

In witness whereof I have hereunto signed my name, this 8th day of February, 1901, in the presence of two subscribing witnesses.

EMIL JOSSE.

Witnesses:
HENRY HASPER,
WOLDEMAR HAUPT.